United States Patent
Inoue

(10) Patent No.: US 7,303,285 B2
(45) Date of Patent: Dec. 4, 2007

(54) PROJECTOR AND METHOD OF PROJECTING PROJECTION IMAGE

(75) Inventor: Hideaki Inoue, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/899,643

(22) Filed: Jul. 26, 2004

(65) Prior Publication Data

US 2005/0024598 A1    Feb. 3, 2005

(30) Foreign Application Priority Data

Jul. 30, 2003    (JP)    ............................. 2003-282306

(51) Int. Cl.
    G03B 21/14    (2006.01)
(52) U.S. Cl. ...................................... 353/70
(58) Field of Classification Search ................. 353/69, 353/70, 122; 348/745, 806
    See application file for complete search history.

(56) References Cited

U.S. PATENT DOCUMENTS

| | | | |
|---|---|---|---|
| 5,455,647 A | 10/1995 | Fujiwara | |
| 6,230,070 B1 | 5/2001 | Yodoshi | |
| 6,310,662 B1 | 10/2001 | Sunakawa et al. | |
| 6,499,849 B1 * | 12/2002 | Huang | 353/121 |
| 6,520,647 B2 * | 2/2003 | Raskar | 353/70 |
| 6,522,393 B2 | 2/2003 | Higashino | |
| 6,741,279 B1 | 5/2004 | Allen | |
| 6,846,081 B2 | 1/2005 | Mochizuki et al. | |
| 6,862,086 B2 | 3/2005 | Kanemitsu et al. | |
| 6,877,864 B1 * | 4/2005 | Tamura et al. | 353/70 |
| 2002/0021418 A1 | 2/2002 | Raskar | |
| 2002/0038462 A1 | 3/2002 | Sakakibara et al. | |
| 2002/0051095 A1 | 5/2002 | Su | |
| 2002/0135747 A1 | 9/2002 | Higashino | |

(Continued)

FOREIGN PATENT DOCUMENTS

EP    0 689 353 A2    12/1995

(Continued)

OTHER PUBLICATIONS

U.S. Appl. No. 10/866,299, filed Jun. 10, 2004; Masahiro Ogawa; "Projector With Tile-Angle Detecting Capability".

(Continued)

Primary Examiner—William C. Dowling
(74) Attorney, Agent, or Firm—Frishauf, Holtz, Goodman & Chick, P.C.

(57) ABSTRACT

A trapezoidal correction unit included in a projector positions a quadrangle p'q'r's' after correction within a quadrangle pqrs before correction, by using inclination angles v and h. In this case, the trapezoidal correction unit performs correction in a manner that the quadrangle p'q'r's' establishes symmetry with respect to a vertical line including a light axis point k which is an intersection of a light axis and a screen, and a part or the all of the bottom side of the quadrangle p'q'r's' contacts or is positioned near a part or the all of the bottom side of the quadrangle pqrs. The trapezoidal correction unit sets the size of the quadrangle p'q'r's' in a manner that the area of the quadrangle p'q'r's' becomes the largest. The trapezoidal correction unit projectively transforms the quadrangle pqrs before correction represented by an input image signal into the quadrangle p'q'r's' after correction temporally continuously.

10 Claims, 7 Drawing Sheets

U.S. PATENT DOCUMENTS

| | | |
|---|---|---|
| 2003/0043303 A1 | 3/2003 | Karuta et al. |
| 2003/0095239 A1 | 5/2003 | Hirao et al. |
| 2004/0061848 A1 | 4/2004 | Kanemitsu et al. |
| 2004/0156033 A1 | 8/2004 | Kanemitsu et al. |
| 2004/0252283 A1 | 12/2004 | Ogawa |
| 2005/0012907 A1 | 1/2005 | Inoue |
| 2005/0052620 A1* | 3/2005 | Tamura ................. 353/69 |
| 2005/0078282 A1* | 4/2005 | Tamura ................. 353/70 |
| 2005/0163396 A1* | 7/2005 | Morichika et al. ........ 382/275 |
| 2005/0168706 A1* | 8/2005 | Sakai ................. 353/69 |

FOREIGN PATENT DOCUMENTS

| | | |
|---|---|---|
| EP | 0 974 811 A1 | 1/2000 |
| EP | 1 193 541 A2 | 4/2002 |
| EP | 1 391 778 A1 | 2/2004 |
| EP | 1 426 732 A1 | 6/2004 |
| JP | 04-355740 | 12/1992 |
| JP | 08-009309 A | 1/1996 |
| JP | 09-197249 A | 7/1997 |
| JP | 2001-230991 A | 8/2001 |
| JP | 2001-339671 A | 12/2001 |
| JP | 2002-062842 A | 2/2002 |
| JP | 2003-029201 A | 1/2003 |
| WO | WO 00/21282 A | 4/2000 |
| WO | WO 02/101443 A | 12/2002 |
| WO | WO 03/017655 A | 2/2003 |

OTHER PUBLICATIONS

U.S. Appl. No. 10/890,567, filed Jul. 12, 2004; Hideaki Inoue; "Projector Apparatus, Inclination Angle Obtaining Method, and Projection Image Correction Method".

Patent Abstracts of Japan, vol. 2000, No. 25, Apr. 12, 2002 and JP 2001-230991 A (Seiko Epson Corp.), Aug. 24, 2001—Abstract only.

* cited by examiner

1 : PROJECTOR
31 : SCREEN

PROJECTOR AND METHOD OF PROJECTING PROJECTION IMAGE

BACKGROUND OF THE INVENTION

1. Field of the Invention

The present invention relates to a projector and a method of projecting a projection image.

2. Description of the Related Art

A projector is an apparatus for displaying an image on a screen. If the light axis of he projector is inclined with respect to the screen surface, the image displayed on the screen surface is distorted. In order that an undistorted image may be displayed on the screen surface even if the light axis is inclined with respect to the screen surface, a projector has a trapezoidal correction unit for correcting a distortion of the image, based on an inclination angle of the light axis with respect to the screen surface. Such a projector is disclosed in, for example, Unexamined Japanese Patent Application KOKAI Publication No. 2001-339671 on page 3 and in FIG. 1.

The trapezoidal correction unit of a conventional projector sets a quadrangle after trapezoidal correction within a quadrangle which is the projection frame before trapezoidal correction. The trapezoidal correction unit corrects an input image signal by projectively transforming the quadrangle before correction represented by the input image signal into the quadrangle after correction temporally continuously.

However, unless the position of the quadrangle after correction is appropriate with respect to a vertical line that passes the light axis point, it becomes necessary to change the inclination angles of the projector both in the vertical direction and in the horizontal direction, at the time of manually correcting the projection position of the projection image in a manner that the position irradiated by the projection light from the projector comes to a right position. Further, since the size of the quadrangle after correction is changed if the inclination angles are changed, it is necessary to adjust the inclination angles while also adjusting the size of the quadrangle after correction. Like this, conventional projectors have a problem that their operability when correcting the projection position of the projection image is poor.

The content of the above-described publication is incorporated herein.

SUMMARY OF THE INVENTION

The present invention was made in view of the above-described conventional problem, and an object of the present invention is to provide a projector and method of projecting a projection image allowing correction of an image distortion by a simple operation when the inclination angles of the projector are changed.

One of the preferred embodiments of the present invention is a projector for projecting a projection light on a screen surface. The projector includes:

a projection unit which converts a projection image into a projection light and projects the projection light on the screen surface; and a correction unit which corrects a distortion of the projection image by using inclination angles of a light axis of the projection light with respect to the screen surface, and which supplies the corrected projection image to the projection unit, wherein:

the projection image is a quadrangle; and the correction unit corrects the projection image by using the inclination angles in such a manner that: (i) the corrected projection image is positioned within the projection image before correction, (ii) the positioned corrected projection image establishes symmetry with respect to a vertical line which passes through an intersection of the light axis of the projection light and the screen surface and is perpendicular to a ground planar surface, and (iii) at least a part of a bottom side of the corrected projection image contacts or is positioned near at least a part of a bottom side of the projection image before correction, irrespective of whether or not a part of a top side of the corrected projection image contacts a part of a top side of the projection image before correction.

Another one of the preferred embodiments of the present invention is a projector for projecting a projection light on a screen surface. The projector includes:

a scaler into which an image signal is input;

a projection unit which converts a projection image into a projection light and projects the projection light on the screen surface;

a screen angle measuring unit which obtains inclination angles of a light axis of the projection light with respect to the screen surface; and a correction unit which corrects a distortion of a projection image corresponding to the image signal, by using the inclination angles obtained by the screen angle measuring unit, and which supplies the corrected projection image to the projection unit, wherein:

the projection image is a quadrangle; and the correction unit corrects the projection image by using the inclination angles in such a manner that: (i) the corrected projection image is positioned within the projection image before correction, (ii) the positioned corrected projection image establishes symmetry with respect to a vertical line which passes through an intersection of the light axis of the projection light and the screen surface and is perpendicular to a ground planar surface, and (iii) at least a part of a bottom side of the corrected projection image contacts or is positioned near at least a part of a bottom side of the projection image before correction, irrespective of whether or not a part of a top side of the corrected projection image contacts with a part of a top side of the projection image before correction.

A further one of the preferred embodiments of the present invention is a method of projecting a projection image. The method includes:

obtaining inclination angles of a light axis of a projection light projected from a projector with respect to a screen surface;

correcting a projection image by using the inclination angles in such a manner that: (i) a corrected projection image is a quadrangle positioned within the projection image before correction, which is also a quadrangle, (ii) the corrected projection image establishes symmetry with respect to a vertical line which passes through an intersection of the light axis of the projection light and the screen surface and is perpendicular to a ground planar surface, and (iii) at least a part of a bottom side of the corrected projection image contacts or is positioned near at least a part of a bottom side of the projection image before correction, irrespective of whether or not a part of a top side of the corrected projection image contacts with a part of a top side of the projection image before correction; and displaying the corrected projection image on the screen surface by converting the corrected projection image into a projection light and projecting the projection light on the screen surface.

According to the present invention, it is possible to realize a high operability in correcting the inclination angles of the light axis of a projection light projected from a projector with respect to a screen surface.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A projector according to the embodiment of the present invention will be explained with reference to the drawings.

Figure 1:
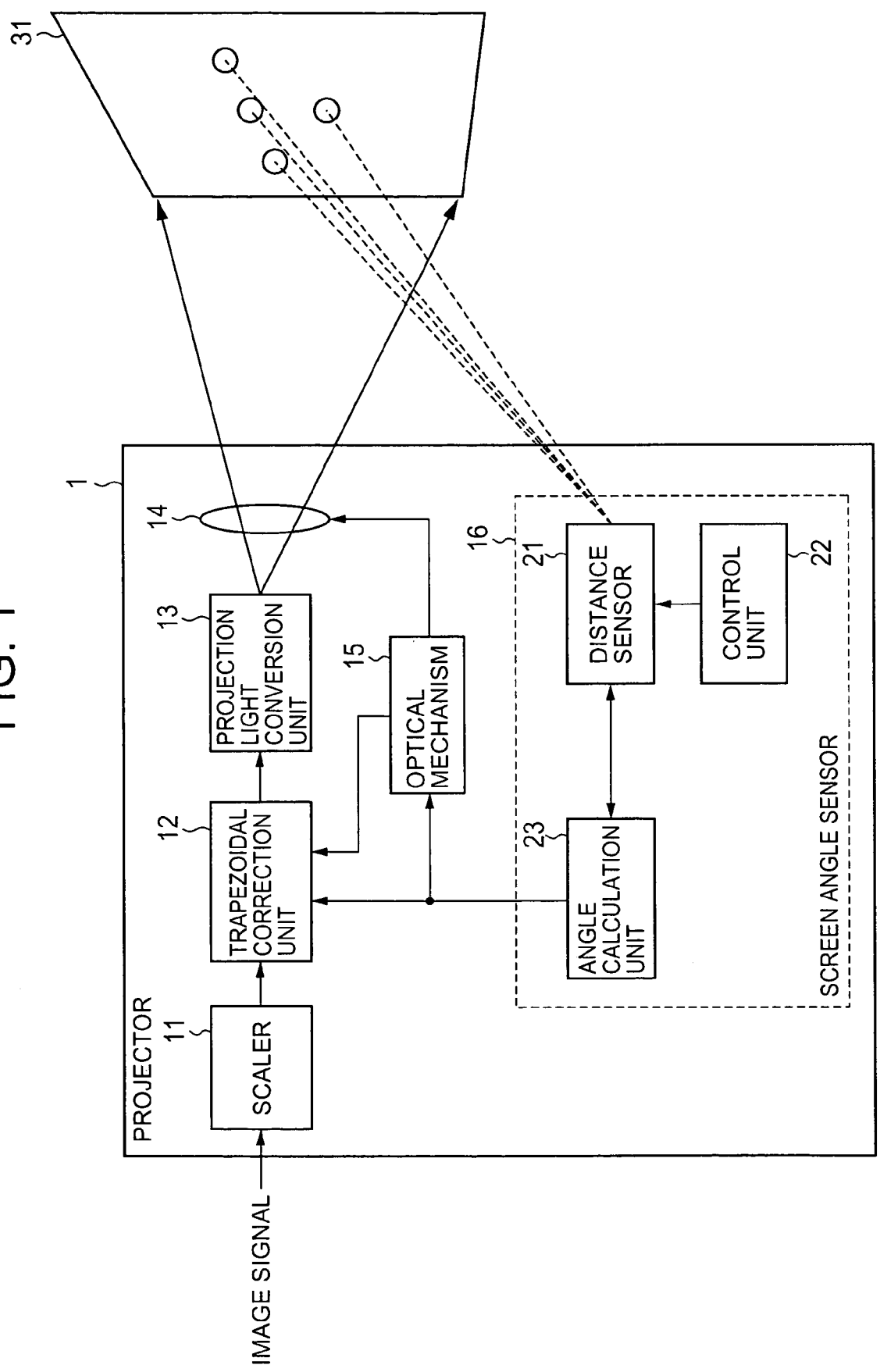
FIG. 1 is a block diagram showing a configuration of a projector according to an embodiment of the present invention.

FIG. 1 shows the configuration of the projector according to the present embodiment.

The projector according to the present embodiment comprises a scaler 11, a trapezoidal correction unit 12, a projection light conversion unit 13, a projection lens 14, an optical mechanism 15, and a screen angle sensor 16.

The scaler 11 adjusts the resolution of an image signal.

The trapezoidal correction unit 12 applies trapezoidal correction to an image signal whose resolution has been adjusted by the scaler 11.

The trapezoidal correction unit 12 cuts out a projection image after correction from a projection image projected on a screen 31, based on inclination angles v and h of the projector 1 which are supplied from the screen angle sensor 16. Then, the trapezoidal correction unit 12 performs trapezoidal correction by projectively transforming an image signal temporally continuously.

Figure 2:
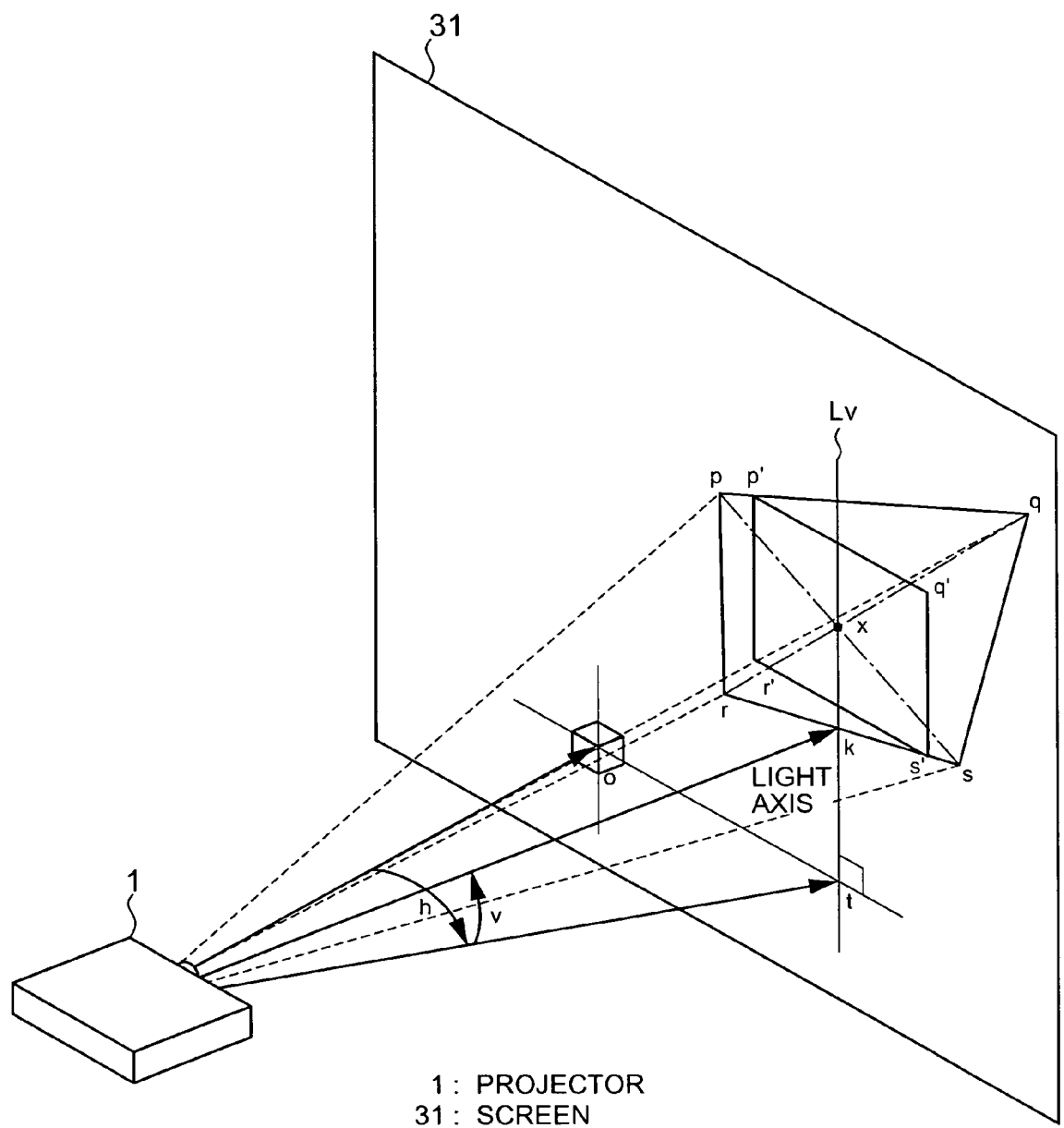
FIG. 2 is a diagram for explaining trapezoidal correction performed by a trapezoidal correction unit of FIG. 1.

As shown in FIG. 2, the inclination angle "v" of the projector 1 is an angle of inclination of the projector 1 with respect to the ground planar surface in the vertical direction. The inclination angle "h" is an angle of inclination (direction) of the projector 1 with respect to the screen surface in the horizontal direction.

It is assumed that the screen 31 is perpendicular to the ground planar surface. Since the screen 31 is perpendicular to the ground planar surface, the inclination angles v and h are equal to the inclination angles of the light axis with respect to the surface of the screen 31. The angle of the light axis of the projection light in a case where the light axis intersects with the screen 31 perpendicularly is used as a reference angle, and the inclination angles v and h are represented as angles of changes from the reference angle in the case where the light axis is inclined with respect to the screen 31.

In FIG. 2, a quadrangle pqrs is the frame of a projection image projected on the screen 31, representing a quadrangle before correction. A quadrangle p'q'r's' represents a quadrangle after correction.

The trapezoidal correction unit 12 sets the quadrangle p'q'r's' after trapezoidal correction within the quadrangle pqrs before trapezoidal correction. The trapezoidal correction unit 12 performs trapezoidal correction by projectively transforming the quadrangle pqrs before correction which is represented by an input image signal into the quadrangle p'q'r's' after correction temporally continuously.

A point "o" is an intersection of the light axis of the projector 1 and the screen 31 in a case where v=h=0. In this case, the light axis is equal to a normal line of the screen 31. A point t is an intersection of the light axis of the projector 1 and the screen 31 in a case where the projector 1 is inclined by the inclination angle h (h≠0) while the inclination angle v=0.

A point k is an intersection of the light axis of the projector 1 and the screen 31 in a case where the projector 1 is further inclined by the inclination angle v (v≠0). The point k is positioned right above the point t on the screen 31. An intersection x of the diagonal lines of the quadrangle pqrs before correction is positioned right above the point k. That is, the point k and point x are positioned on a vertical line Lv on the screen 31 that passes the point t.

The trapezoidal correction unit 12 has means for performing correction in a manner that the quadrangle p'q'r's' establishes symmetry with respect to the vertical line Lv including the point k and a part or the all of the bottom side of the quadrangle p'q'r's' contacts a part or the all of the bottom side of the quadrangle pqrs.

The trapezoidal correction unit 12 performs correction in a manner that the area of the quadrangle p'q'r's' becomes the largest within the quadrangle pqrs while the quadrangle p'q'r's' satisfies the above conditions.

Figure 3:
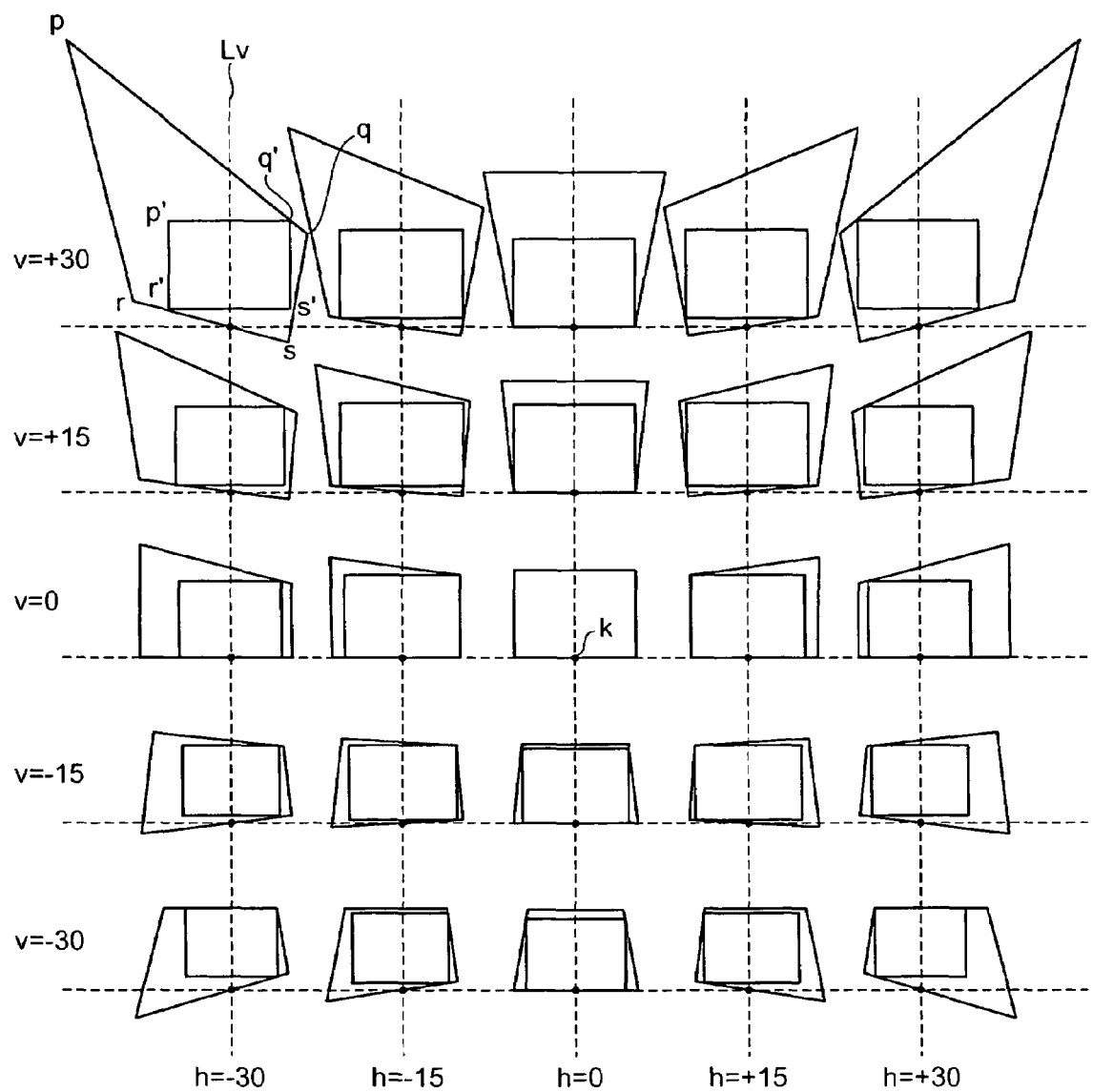
FIG. 3 is a diagram for explaining relationships among inclination angles, a quadrangle before correction, and a quadrangle after correction, in a case where the trapezoidal correction unit of FIG. 1 performs trapezoidal correction.

FIG. 3 shows relationships among the inclination angles v and h, the quadrangle pqrs before correction, and the quadrangle p'q'r's' after correction in the case where the trapezoidal correction unit 12 performs trapezoidal correction in the above-described manner.

In FIG. 3, the inclination angles v and h are represented on the premise that the angle at which the light axis of the projection light intersects with the surface of the screen 31 perpendicularly is used as the reference angle. In a case where the inclination angles v=0, and h≠0, and in a case where the inclination angles h=0, and v≠0, the point k coincides with the center of the bottom side of the quadrangle p'q'r's'.

FIG. 3 is drawn under the following conditions. Twenty-five pairs of the quadrangle pqrs before correction and the quadrangle p'q'r's' after correction are drawn independently. The point k (light axis point) which is the intersection of the light axis of the projector 1 and the screen 31 is indicated by a small circle. All the pairs are drawn in a manner that the distance between the light axis point k and the projector 1 becomes constant. The unit of the inclination angles v and h is degree. The optical system is set such that the aspect ratio of an image signal is 4:3, the position of the light axis coincides with the center of the bottom side of the quadrangle before correction which is represented by an image signal, and the total angle of view widthwise is 40 degrees.

The shape of the quadrangle pqrs is dependent on the inclination angles v and h. The shape of the quadrangle p'q'r's' is also determined depending on this condition. Therefore, the trapezoidal correction unit 12 can perform this correction by using a translation table representing relationships among the inclination angles v and h, the quadrangle pqrs before correction, and the quadrangle after correction p'q'r's'. In this case, the trapezoidal correction unit 12 has a memory for storing the translation table.

However, the trapezoidal correction unit 12 may be configured to obtain the quadrangle pqrs before correction and the quadrangle p'q'r's' after correction, based on the inclination angles v and h, without using such a translation table. Further, the projector 1 may be provided with a sensor for detecting the quadrangle pqrs actually projected on the screen 31.

The projector 1 has an operation unit (not shown) for a user to manually adjust the inclination angles of the projector 1 with respect to the screen 31. The operation unit is provided with operation keys such as up and down keys for allowing manual adjustment of the inclination angles v and h. When the user operates the operation keys to correct the inclination angles, the operation unit, in response to the user's operation, supplies operation information to the trapezoidal correction unit 12. In accordance with the operation information, the trapezoidal correction unit 12 performs correction based on the inclination angles v and h input by the user.

The projection light conversion unit 13 converts a post-correction image signal output from the trapezoidal correction unit 12 into a projection light.

The projection lens 14 is used for irradiating the projection light resulting from the conversion of the post-correction image signal by the projection light conversion unit 13, on the surface of the screen 31.

The optical mechanism 15 controls the focus and the like of the projection lens 14.

The screen angle sensor 16 detects the inclination angles v and h of the surface of the screen 31 with respect to the light axis of the light projected from the projector 1. The screen angle sensor 16 comprises a distance sensor 21, a control unit 22, and an angle calculation unit 23.

The distance sensor 21 measures the distances between the projector 1 and a plurality of measurement points on the screen 31, and outputs distance data representing the measurement results. It is only necessary for the distance sensor 21 to measure the distances between the projector 1 and at least three measurement points. The distance sensor 21 may be an active type one or a passive type one.

The control unit 22 controls the distance sensor 21 to measure the distances between the projector 1 and a plurality of points on the screen 31. In a case where the distance sensor 21 is an active type one, the control unit 22 controls the distance sensor 21 at the time of measurement to project an infrared spotlight on the screen 31. In a case where the distance sensor 21 is a passive type one, the control unit 22 controls the distance sensor 21 at the time of measurement to project a predetermined image pattern on the screen 31.

The angle calculation unit 23 calculates the inclination angles v and h of the screen 31 by using the distance data representing the distances between the projector 1 and a plurality of measurement points on the screen 31 measured by the distance sensor 21. The angle calculation unit 23 is constituted by, for example, a DSP (Digital Signal Processor) or a computer.

The operation of the projector 1 according to the present embodiment will now be explained.

The scaler 11 adjusts the resolution of an input image signal, and supplies the adjusted image signal to the trapezoidal correction unit 12.

The distance sensor 21 of the screen angle sensor 16 measures the distances between the projector 1 and a plurality of measurement points on the screen 31 under the control of the control unit 22. The distance sensor 21 supplies distance data representing the measurement results to the angle calculation unit 23.

The angle calculation unit 23 calculates the inclination angles v and h of the projector 1 by using the distance data representing the distances measured by the distance sensor 21. The angle calculation unit 23 supplies the calculated inclination angles v and h to the trapezoidal correction unit 12.

The trapezoidal correction unit 12 applies trapezoidal correction to the image signal supplied from the scaler 11, based on the supplied inclination angles v and h.

At this time, the trapezoidal correction unit 12 performs trapezoidal correction in a manner that the quadrangle p'q'r's' after correction establishes line symmetry with respect to the vertical line Lv including the light axis point k, and a part or the all of the bottom side of the quadrangle p'q'r's' contacts a part or the all of the bottom side of the quadrangle pqrs before correction, as shown in FIG. 3. The trapezoidal correction unit 12 sets the position of the quadrangle p'q'r's' in a manner that the area thereof becomes the largest while the quadrangle p'q'r's' satisfies these conditions.

Then, the trapezoidal correction unit 12 projectively transforms the quadrangle pqrs before correction represented by the input image signal into the quadrangle p'q'r's' after correction.

The projection light conversion unit 13 converts the image signal output from the trapezoidal correction unit 12 into a projection light.

The projector 1 projects the projection light on the screen 31 via the projection lens 14 which is adjusted by the optical mechanism 15 to be in focus. Thus, the quadrangle p'q'r's' after correction is projected on the screen 31.

By the trapezoidal correction unit 12 performing trapezoidal correction in the above-described manner, the quadrangle p'q'r's' after correction is displayed at a position corresponding to the horizontal angle h of the projector 1. That is, irrespective of the inclination angles v and h, the quadrangle p'q'r's' after correction becomes symmetric with respect to the vertical line Lv passing the light axis point k. In a case where the vertical direction inclination angle v=0 and the horizontal direction inclination angle h≠0, and in a case where the horizontal direction inclination angle h=0 and the vertical direction inclination angle v≠0, the light axis point k coincides with the center of the bottom side of the quadrangle p'q'r's' after correction. Further, in a case where the vertical direction inclination angle v=0 and the horizontal direction inclination angle h≠0, the quadrangle p'q'r's' after correction can become as large as possible in size.

A user may correct the projection position of the projection image manually. In this case, the user inputs the inclination angles v and h by operating the operation keys of the unillustrated operation unit provided to the projector 1. In response to the user's operation, the operation unit supplies the input inclination angle v and h to the trapezoidal correction unit 12. The trapezoidal correction unit 12 performs trapezoidal correction based on the inclination angles v and h input by the user, regardless of the measured distances. In this way, the projection image of the projector 1 is corrected with a small number of operations.

As explained above, according to the present embodiment, the trapezoidal correction unit 12 sets the quadrangle after correction by performing trapezoidal correction in a manner that the quadrangle after correction establishes symmetry with respect to the vertical line Lv including the light axis point k and a part or the all of the bottom side of the quadrangle after correction contacts a part or the all of the bottom side of the quadrangle before correction. Further, the trapezoidal correction unit 12 sets the position of the quadrangle after correction within the quadrangle before correction in a manner that the area of the quadrangle after correction becomes the largest while the quadrangle after correction satisfies these conditions.

As a result, since the quadrangle after correction establishes symmetry with respect to the vertical line Lv, the quadrangle after correction can be set as large as possible. Further, the user can correct the projection image with a small number of operations, by inputting the inclination angles of the projector 1 with respect to the screen 31 manually. That is, a high operability can be realized.

To implement the present invention, not only the above-described embodiment but also various other embodiments can be considered.

Figure 4:
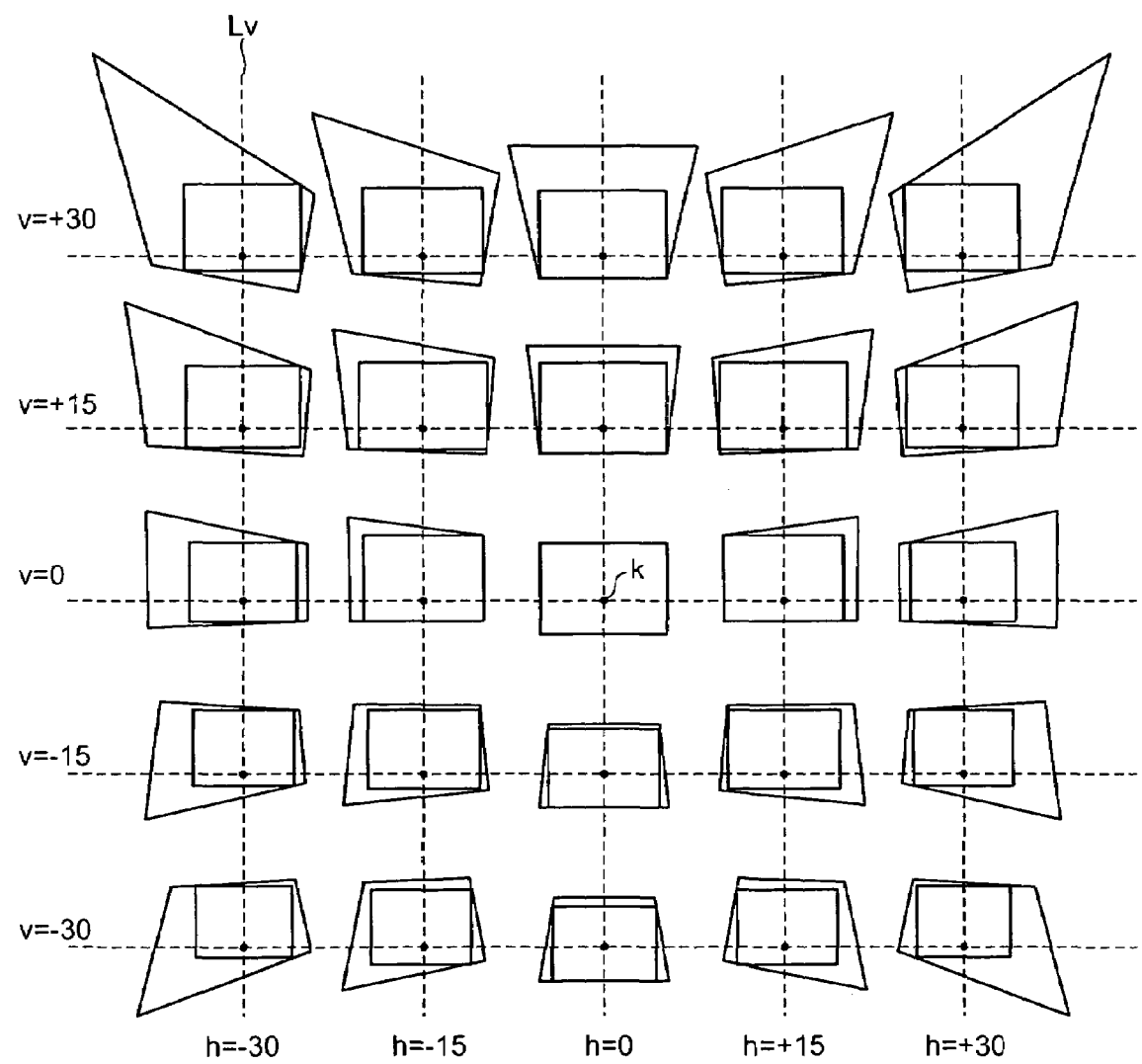
FIG. 4 is a diagram showing a modified example of trapezoidal correction performed by the trapezoidal correction unit of FIG. 1, specifically explaining relationships among inclination angles, a quadrangle before correction, and a quadrangle after correction in a case where a light axis point is not positioned on the bottom side of the quadrangle before correction.

The light axis point k is not necessarily positioned on the bottom side of the quadrangle before correction represented by an image signal. There may be a case where the light axis point k is positioned above the bottom side of the quadrangle before correction or beneath the bottom side thereof, as shown in FIG. 4. Also in this case, the quadrangle after correction is set in the manner that it establishes symmetry with respect to the vertical line Lv including the light axis point k and a part or the all of the bottom side of the quadrangle after correction contacts a part or the all of the bottom side of the quadrangle before correction, likewise the above-described case. However, in a case where v=0 and h≠0, the light axis point k does not coincides with the center of the bottom side of the quadrangle after correction.

Generally, the optical system of the projector 1 of a front type is designed to be symmetric in the leftward and rightward direction and to be asymmetric in the upward and downward direction. In this case, the light axis passes near the center of the bottom side of the quadrangle before correction represented by an image signal. By positioning the quadrangle after correction nearer to the bottom side of the quadrangle before correction, it is possible to minimize the gap between the position of the light axis point and the display position (the position of the quadrangle after correction). Also in this case, operation for correction is easy.

Further, it is possible to position the bottom side of the quadrangle after correction near the bottom side of the quadrangle before correction (projection image) without making the bottom side of the quadrangle after correction contact the bottom side of the quadrangle before correction. In this case, the distance between the bottom side, particularly, a bottom corner, of the quadrangle after correction and the bottom side of the quadrangle before correction is set as short as possible.

The trapezoidal correction unit 12 may be configured to have a plurality of means for correcting a projection image before correction in different manners from each other in addition to the above-described manner of trapezoidal correction, and to perform correction of the projection image by selecting the correction manner explained in the above-described embodiment from the plurality of correction manners.

Figure 5:
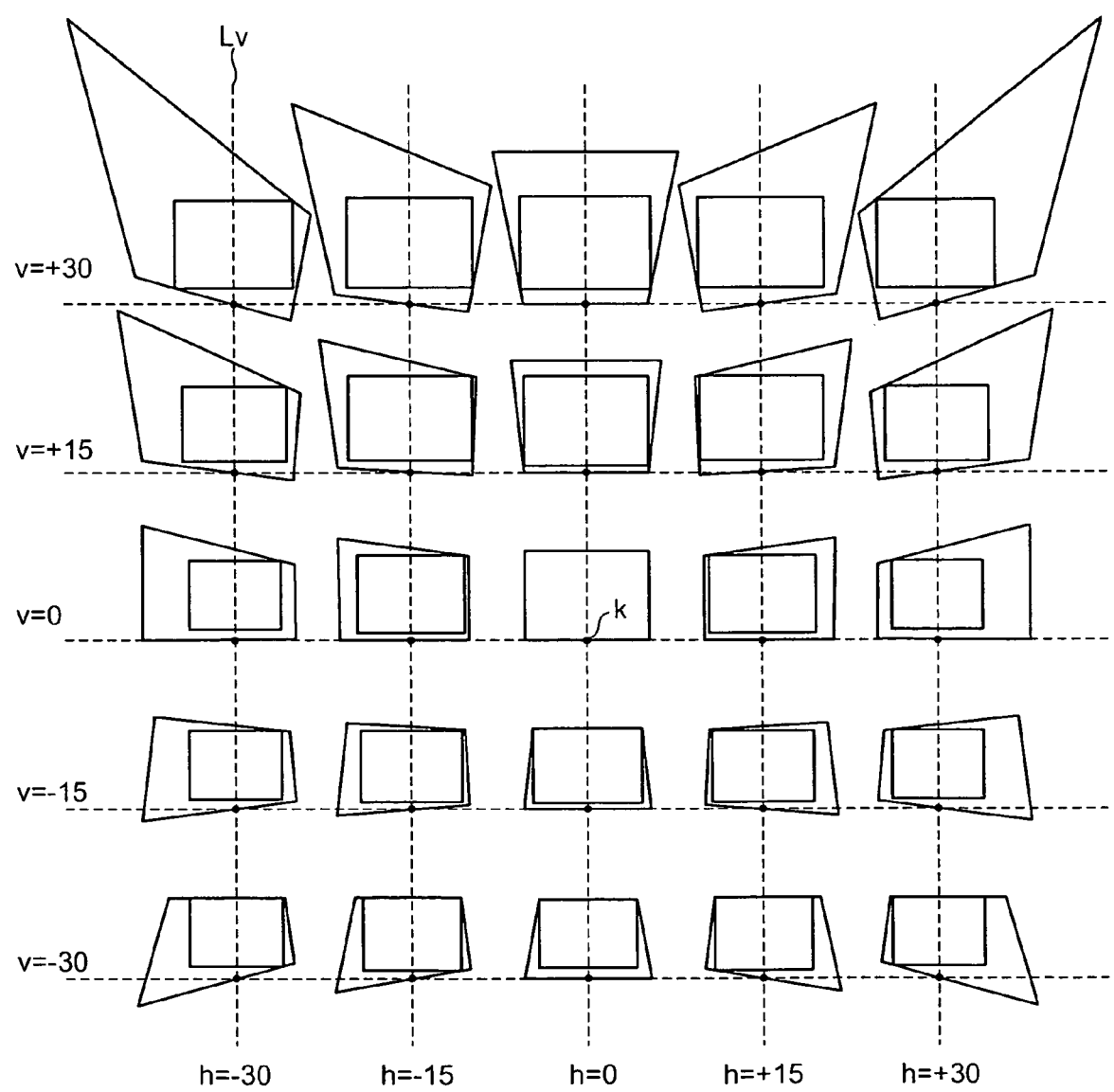
FIG. 5 is a diagram showing a modified example of trapezoidal correction performed by the trapezoidal correction unit of FIG. 1, specifically explaining relationships among inclination angles, a quadrangle before correction, and a quadrangle after correction in a case where trapezoidal correction for making the center of the quadrangle after correction and the center of the quadrangle before correction coincide is performed.
Figure 6:
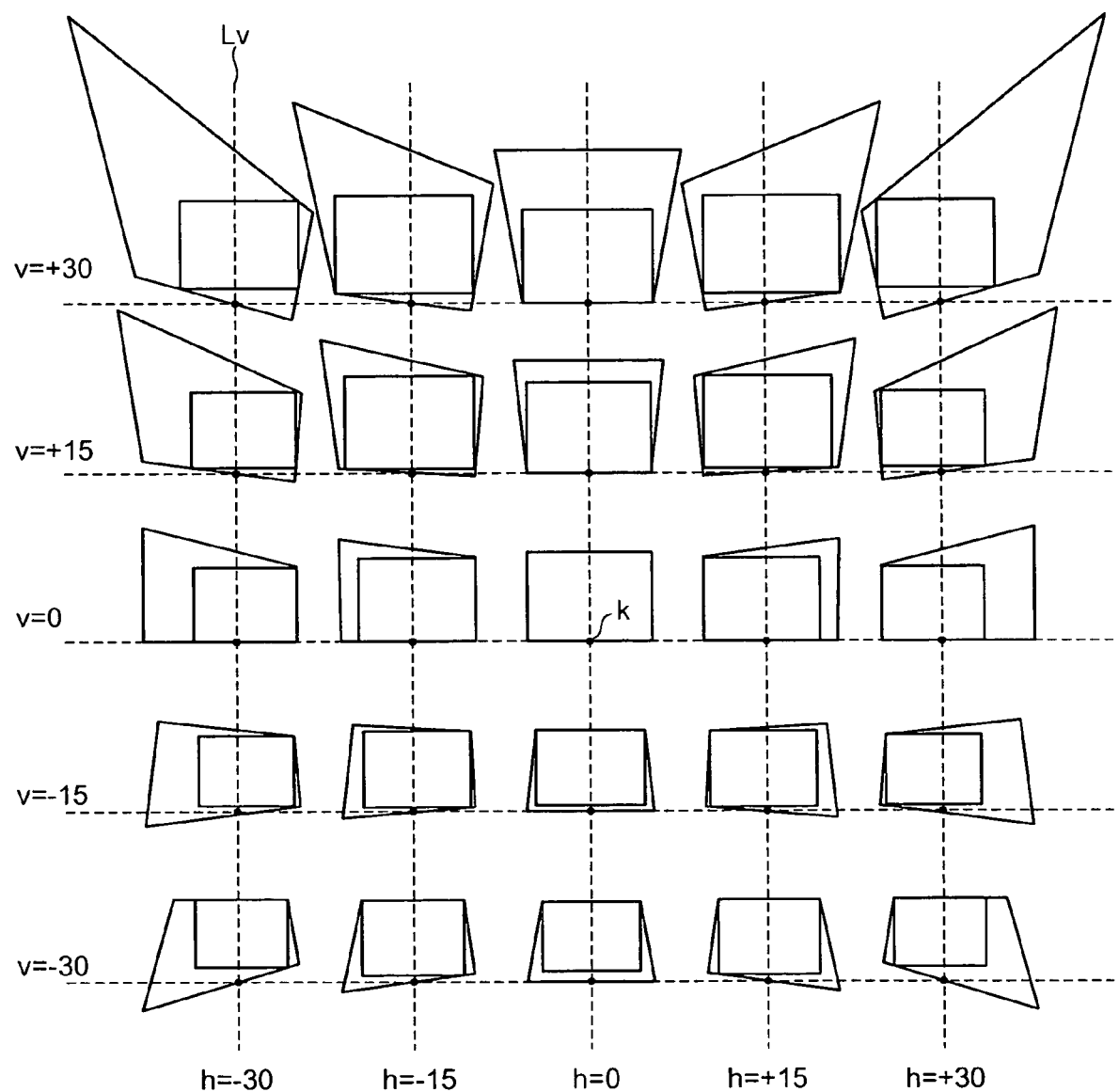
FIG. 6 is a diagram showing a modified example of trapezoidal correction performed by the trapezoidal correction unit of FIG. 1, specifically explaining relationships among inclination angles, a quadrangle before correction, and a quadrangle after correction in a case where trapezoidal correction for positioning the quadrangle after correction to a side of the quadrangle before correction which side has a higher pixel density is performed.
Figure 7:
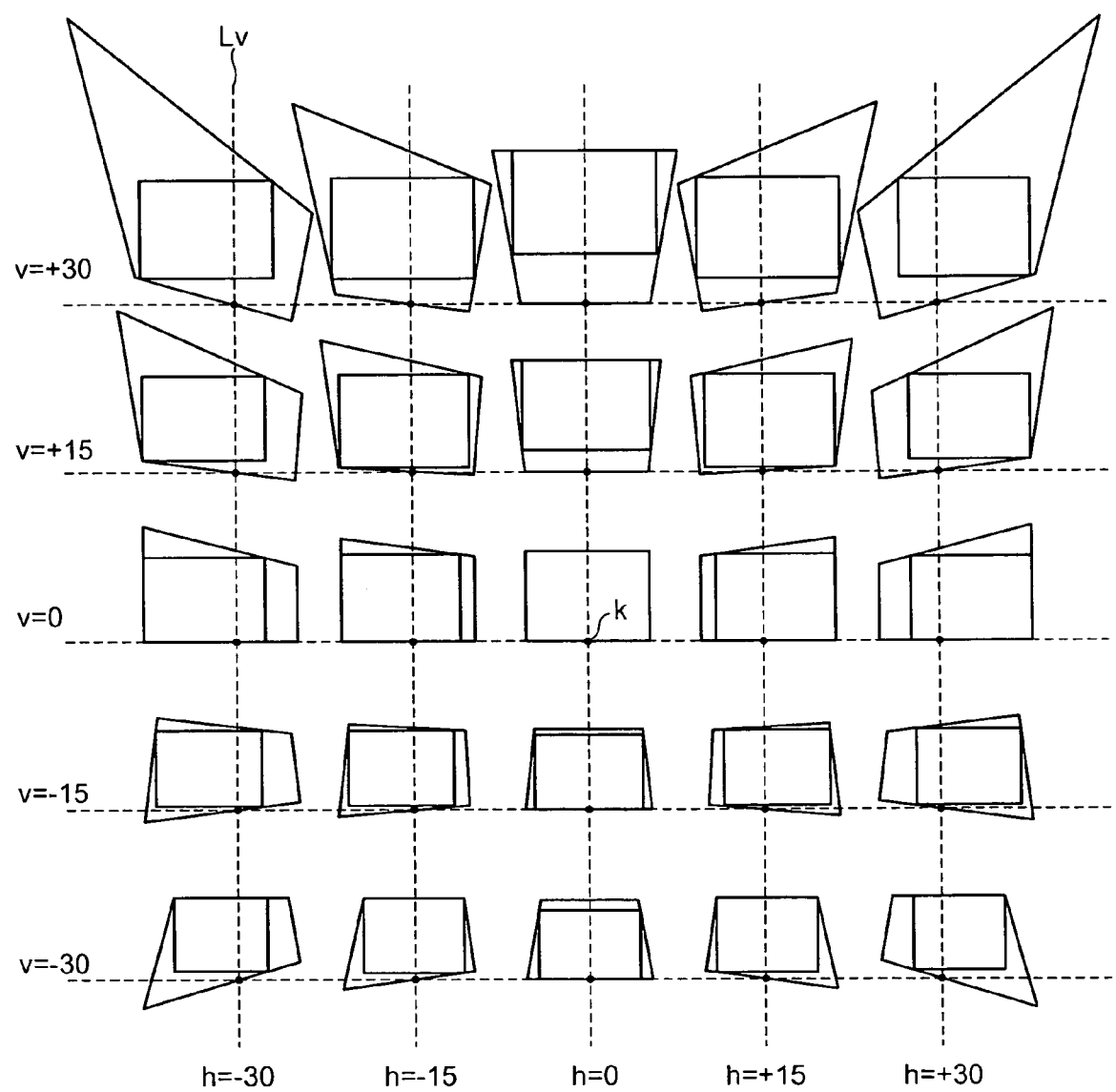
FIG. 7 is a diagram showing a modified example of trapezoidal correction performed by the trapezoidal correction unit of FIG. 1, specifically explaining relationships among inclination angles, a quadrangle before correction, and a quadrangle after correction in a case where trapezoidal correction for positioning the quadrangle after correction to a side of the quadrangle before correction which side has a lower pixel density is performed.

As manners of correction different from the correction manner explained in the above-described embodiment, there are manners according to which positional relationships between the quadrangle before correction and the quadrangle after correction as shown in FIG. 5 to FIG. 7 are realized.

The correction manner shown in FIG. 5 is one according to which the center of the quadrangle before correction and the center of the quadrangle after correction coincide. Note that the center of a quadrangle (image) is the intersection of the diagonal lines.

The correction manner shown in FIG. 6 is one according to which the quadrangle after correction is drawn to a side of the quadrangle before correction which side has a higher pixel density.

To the contrary, the correction manner shown in FIG. 7 is one according to which the quadrangle after correction is drawn to a side of the quadrangle before correction which side has a lower pixel density. However, in any case, the quadrangle after correction is selected such that the display area, that is, the area of the quadrangle after correction becomes as large as possible.

The correction manners shown in FIG. 5 to FIG. 7 have advantages though also having disadvantages. For example, according to the manner shown in FIG. 5, the centers of the quadrangles always coincide. According to the manner shown in FIG. 6, the utilization efficiency of the pixels is the highest. According to the manner shown in FIG. 7, the projection area is the largest. The trapezoidal correction unit 12 stores translation tables for performing correction in the manners shown in FIG. 5 to FIG. 7 based on the inclination angles v and h, in the memory. The trapezoidal correction unit 12 performs trapezoidal correction by normally selecting the manner explained in the above-described embodiment, and by selecting one of the correction manners shown in FIG. 5 to FIG. 7 depending on situations and using the translation table depending on situations. If the trapezoidal correction unit 12 is configured in this way, the operability is further improved and appropriate trapezoidal correction can be performed.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-282306 filed on Jul. 30, 2003 and including specification, claims, drawings and summary. The disclosure of the above Japanese Patent Application is incorporated herein by reference in its entirety.

What is claimed is:

1. A projector for projecting a projection light on a screen surface, comprising:
    a projection unit which converts a projection image into a projection light and projects the projection light on the screen surface; and
    a correction unit which corrects a distortion of the projection image by using inclination angles of a light axis of the projection light with respect to the screen surface, and which supplies the corrected projection image to the projection unit,
    wherein:
        the correction unit comprises a memory for pre-storing relational information representing relationships among the inclination angles, the projection image before correction, and the corrected projection image; and
        the correction unit transforms the projection image before correction, which is a quadrangle, into the corrected projection image, which is also a quadrangle, by correcting the projection image before correction by using the relational information stored in the memory and the inclination angles in such a manner that: (i) the corrected projection image is positioned within the projection image before correction, (ii) the positioned corrected projection image establishes symmetry with respect to a vertical line which passes through an intersection of the light axis of the projection light and the screen surface and is perpendicular to a ground planar surface, and (iii) at least a part of a bottom side of the corrected projection image contacts or is positioned near at least a part of a bottom side of the projection image before correction.

2. The projector according to claim 1, wherein the correction unit is configured to use an angle at which the light axis of the projection light intersects with the screen surface perpendicularly as a reference angle, to represent the inclination angles of the light axis with respect to the screen surface as angles of change from the reference angle, and to correct the projection image before correction by using the angles of change.

3. The projector according to claim 1, wherein the correction unit is configured to position the corrected projection image within the projection image before correction in a manner such that an area of the corrected projection image is maximized.

4. The projector according to claim 1, wherein the correction unit comprises a plurality of correction means for correcting the projection image before correction in different manners from each other, including correction means for correcting the projection image before correction by using the inclination angles in a manner such that the corrected projection image establishes symmetry with respect to the vertical line which passes through the intersection of the light axis of the projection light and the screen surface and is perpendicular to the ground planar surface, and such that at least a part of the bottom side of the corrected projection image contacts or is positioned near at least a part of the bottom side of the projection image before correction, and wherein the correction unit is configured to select the correction means from the plurality of correction means, and to correct the projection image by the selected correction means.

5. A projector for projecting a projection light on a screen surface, comprising:
    a scaler into which an image signal is input;
    a projection unit which converts a projection image into a projection light and projects the projection light on the screen surface;
    a screen angle measuring unit which obtains inclination angles of a light axis of the projection light with respect to the screen surface; and
    a correction unit which corrects a distortion of a projection image corresponding to the image signal, by using the inclination angles obtained by the screen angle measuring unit, and which supplies the corrected projection image to the projection unit,
    wherein:
        the correction unit comprises a memory for pre-storing relational information representing relationships among the inclination angles, the projection image before correction, and the corrected projection image; and
        the correction unit transforms the projection image before correction, which is a quadrangle, into the corrected projection image, which is also a quadrangle, by correcting the projection image before correction by using the relational information stored in the memory and the inclination angles in such a manner that: (i) the corrected projection image is positioned within the projection image before correction, (ii) the positioned corrected projection image establishes symmetry with respect to a vertical line which passes through an intersection of the light axis of the projection light and the screen surface and is perpendicular to a ground planar surface, and (iii) at least a part of a bottom side of the corrected projection image contacts or is positioned near at least a part of a bottom side of the projection image before correction.

6. The projector according to claim 5, wherein the screen angle measuring unit comprises:
    a distance sensor which measures distances between the projector and a plurality of points on the screen surface; and
    an angle calculation unit which calculates the inclination angles by using the distances measured by the distance sensor.

7. The projector according to claim 5, wherein the correction unit is configured to use an angle at which the light axis of the projection light intersects with the screen surface perpendicularly as a reference angle, to represent the inclination angles of the light axis with respect to the screen surface as angles of change from the reference angle, and to correct the projection image before correction by using the angles of change.

8. The projector according to claim 5, wherein the correction unit is configured to position the corrected projection image within the projection image before correction in a manner such that an area of the corrected projection image is maximized.

9. The projector according to claim 5, wherein the correction unit comprises a plurality of correction means for correcting the projection image before correction in different manners from each other, including correction means for correcting the projection image before correction by using the inclination angles in a manner such that the corrected projection image establishes symmetry with respect to the vertical line which passes through the intersection of the light axis of the projection light and the screen surface and is perpendicular to the ground planar surface, and such that at least a part of the bottom side of the corrected projection image contacts or is positioned near at least a part of the bottom side of the projection image before correction, and wherein the correction unit is configured to select the correction means from the plurality of correction means, and to correct the projection image by the selected correction means.

10. A method of projecting a projection image, comprising:
   obtaining inclination angles of a light axis of a projection light projected from a projector with respect to a screen surface;
   pre-storing relational information representing relationships among the inclination angles, a projection image before correction, and a corrected projection image;
   transforming the projection image before correction, which is a quadrangle, into the corrected projection image, which is also a quadrangle, by correcting the projection image before correction by using the pre-stored relational information and the inclination angles in such a manner that (i) the corrected projection image is positioned within the projection image before correction, (ii) the corrected projection image establishes symmetry with respect to a vertical line which passes through an intersection of the light axis of the projection light and the screen surface and is perpendicular to a ground planar surface, and (iii) at least a part of a bottom side of the corrected projection image contacts or is positioned near at least a part of a bottom side of the projection image before correction; and
   displaying the corrected projection image on the screen surface by converting the corrected projection image into a projection light and projecting the projection light on the screen surface.

* * * * *